United States Patent [19]

Velenovsky et al.

[11] 4,130,629
[45] Dec. 19, 1978

[54] CONTROL OF HALOMETHYL ETHER EMISSIONS

[75] Inventors: Joseph J. Velenovsky, Linthicum Heights, Md.; Manuel Alvarez, East Brunswick, N.J.

[73] Assignee: FMC Corporation, Philadelphia, Pa.

[21] Appl. No.: 861,143

[22] Filed: Dec. 16, 1977

[51] Int. Cl.$^2$ ............................................. B01D 53/34
[52] U.S. Cl. .................................... 423/240; 423/245; 568/681; 568/682
[58] Field of Search ............... 423/210, 240, 241, 245; 260/614 R, 616 R

[56] References Cited

U.S. PATENT DOCUMENTS 3,980,755  9/1976  Black et al. .................... 423/240

Primary Examiner—Earl C. Thomas
Attorney, Agent, or Firm—Robert L. Andersen; H. Robinson Ertelt

[57] ABSTRACT

Emissions of halomethyl ethers are controlled by contacting a gaseous effluent stream containing said ethers with a scrubbing solution comprising an alkali metal hydroxide, a lower dialkanolamine and a lower alkylene glycol.

3 Claims, No Drawings

CONTROL OF HALOMETHYL ETHER EMISSIONS

The present invention relates to emission controls, particularly to a method for removing halomethyl ethers from gaseous effluent streams containing such ethers.

Halomethyl ethers are by-products of the halomethylation of an aromatic nucleus. For example, when dihydrosafrole is chloromethylated with paraformaldehyde and hydrochloric acid, the gaseous effluent stream from the reaction is contaminated with bis-chloromethyl ether, a known carcinogen.

U.S. Pat. No. 3,980,755, issued Sept. 14, 1976, describes a process for removing bis-chloromethyl ether from gaseous effluent streams by adsorption on silica gel followed by hydrolytic decomposition. Products of the decomposition include hydrogen chloride, formaldehyde, methanol and methylal, all of which must then be removed in a secondary scrubber.

It has now been found that halomethyl ethers, in particular bis-chloromethyl ether, is readily removed from an effluent gas stream by contacting the stream with an aqueous solution of an alkali metal hydroxide, a lower dialkanolamine and a lower alkylene glycol.

Thus, the present invention comprises a method for removing a halomethyl ether of the formula $R_1$-O-$R_2$ wherein one of $R_1$ and $R_2$ is halomethyl and the other is alkyl of one or two carbon atoms or halomethyl. Examples of pollutants controlled in accordance with the present invention are halomethyl methyl ethers such as chloromethyl methyl ether, bromomethyl methyl ether or iodomethyl methyl ether; and bis-halomethyl ethers such as bis-chloromethyl ether, bis-bromomethyl ether and bis-iodomethyl ether.

In the preferred embodiment bis-chloromethyl ether is removed from a gaseous effluent stream by contacting the stream with an aqueous scrubbing solution consisting essentially of an aqueous alkali metal hydroxide, a lower dialkanolamine and a lower alkylene glycol. Optionally the scrubbing solution may be provided with a flow of a minor amount of ammonia (1–20%) in nitrogen without departing from the spirit and scope of the present invention.

An example of a halomethylation reaction that produces by-product bis-chloromethyl ether is one in which dihydrosafrole (I) is chloromethylated with paraformaldehyde in accordance with the general equation

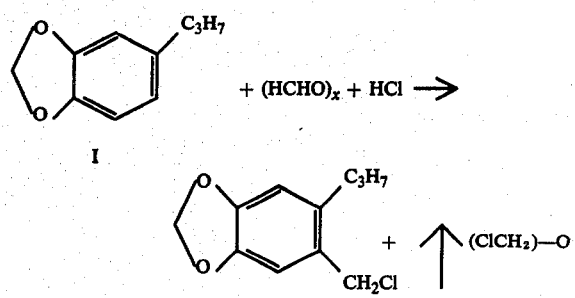

The effluent gases are vented through a primary scrubber, which is a column filled with aqueous sodium hydroxide and ethylene glycol into which is bubbled a stream of 5% ammonia in nitrogen. The effluent from the primary scrubber contains bis-chloromethyl ether at unacceptably high levels, typically as high as hundreds to thousands of parts per billion by volume (Vppb).

In the present invention the contaminated gaseous effluent is passed through a scrubbing column provided with vapor-liquid contact means and the three component scrubbing solution described generally above. It is contemplated that this column may be substituted for the primary scrubber described above or may be a secondary column which receives the effluent from such a primary scrubber.

The dimensions of the column are not critical and may be modified as desired. It is desirable to have a packing or other vapor liquid contact means to improve the contact between the solution and the gases passed through the column. For example, distillation rings or other inert packings may be employed.

In order to assure adequate removal of halomethyl ethers a three component aqueous scrubbing solution is utilized. The first component is an alkali metal hydroxide, suitably sodium or potassium hydroxide, preferably sodium hydroxide. The alkali metal hydroxide is present at a concentration in the range of 0.5 to about 10 weight percent based on the total weight of the scrubbing solution.

The second component of the aqueous scrubbing solution is a lower alkylene glycol, suitably having 2 to 4 carbon atoms, preferably ethylene glycol. This component is present at a concentration in the range of about 20 to 60 weight percent, preferably 30 to about 55 percent by weight of the scrubbing solution.

The third component of the scrubbing solution is suitably a lower dialkanolamine having four or six carbon atoms, preferably diethanolamine. This component of the scrubbing solution is present at a concentration in the range of about 5% up to about 30% by weight of the scrubbing solution, preferably in the range of about 10% up to about 20 weight percent.

The temperature at which the scrubber is operated, i.e., the temperature of the scrubbing solution, is not critical. Typically the scrubber may be operated at ambient temperatures as high as 40° C. or as low as −20° C. It is important, however, in selecting ratios of the components that they be chosen so that the solution does not become too viscous for normal operations, particularly at lower temperatures.

The following example demonstrates the practice of the invention.

EXAMPLE 1

A column approximately 7 ft. high and 30 in. in diameter was connected to the outlet of a primary scrubber in a chemical plant reaction vent system. The column was filled to approximately 75% of capacity with distillation rings and a solution of sodium hydroxide, ethylene glycol and diethanolamine. The percentages of the three components are shown in Table I. Sufficient scrubbing solution was provided to cover the distillation rings. The reactor vented by this scrubbing system was charged with paraformaldehyde then sealed. Hydrochloric acid was then pumped into the reactor. Two hours after the hydrochloric acid had been completely introduced into the reaction vessel, the stream being vented from the primary scrubber was sampled using absorber tubes filled with Chromosorb 101 (Johns Manville Corporation) and analyzed by the method described in ANAL. CHEM. 45 (14), 2341 (1973). The results of various runs made in the foregoing manner are set forth in Table I. Runs 1 through 4 were early runs made before the system stabilized. In Run 7, the actual amount of bis-chloromethyl ether at the inlet was not accurately established and is accordingly reported as greater than 17.8 Vppb. This example demonstrates that emissions of bis-chloromethyl ether are reduced from hundreds of parts per billion by volume down to tenths of parts per billion by volume. The level of detectability using technology currently available is about 0.1 Vppb.

TABLE I

| | Charge to tertiary scrubber Weight percent[a] | | | Bis-chloromethyl ether Concentration, Vppb[b] | |
|---|---|---|---|---|---|
| Run | NaOH | Ethylene glycol | Diethanol amine | Inlet | outlet |
| 1 | 2.6 | 35.8 | 14.7 | 115 | 0.90 |
| 2 | 3.0 | 52.4 | 18.8 | 51 | 0.26 |
| 3 | 3.4 | 53.2 | 17.8 | 160 | 4.75 |
| 4 | 2.4 | 49.1 | 17.2 | 450 | 4.25 |
| 5 | 2.4 | 45.7 | 17.0 | 3662 | 7.7 |
| 6 | 1.9 | 52.0 | 17.3 | 100 | N.D. |
| 7 | 1.6 | 41.9 | 15.3 | <17.8 | 3.77[d] |
| 8 | 1.4 | 40.4 | 16.0 | 69(100)[e] | 0.02(0.21)[d,e] |
| 9 | 2.5 | 36.3 | 15.7 | 1.5 | 0.09[d] |
| 10 | 2.4 | 37.8 | 15.3 | 62.5 | 0.21[d] |
| 11 | 2.2 | 38.0 | 14.7 | 210 | 0.31[d] |
| 12 | 1.4 | 39.1 | 15.9 | 89.4 | 0.14[d] |
| 13 | 1.6 | 36.7 | 16.3 | 65.9 | N.D. |

[a] The remainder is water.
[b] Vppb = Volume parts per billion
[c] ND - below 0.1 ppb
[d] 70 cc/min of 5% ammonia in nitrogen bubbled into scrubber
[e] Duplicate samples analyzed at different laboratory.

We claim:
1. A method for removing halomethyl ethers from a gaseous effluent stream comprising contacting said stream with an aqueous scrubbing solution consisting essentially of water, an alkali metal hydroxide, a lower alkylene glycol having 2 to 4 carbon atoms and a lower dialkanolamine having 4 to 6 carbon atoms.

2. The method of claim 1 wherein said scrubbing solution contains 0.5 to 10 weight percent alkali metal hydroxide, 20 to 60 weight percent of said alkylene glycol and 5 to 30 percent of said dialkanolamine.

3. The method of claim 2 wherein said solution contains sodium hydroxide, ethylene glycol and diethanolamine and wherein said halomethyl ether is bis-chloromethyl ether.

* * * * *

UNITED STATES PATENT AND TRADEMARK OFFICE
CERTIFICATE OF CORRECTION

PATENT NO. : 4,130,629

DATED : December 19, 1978

INVENTOR(S) : Joseph J. Velenovsky and Manuel Alvarez

It is certified that error appears in the above-identified patent and that said Letters Patent are hereby corrected as shown below:

Column 2, line 29, "about 20 to 60" should read --about 20 to about 60--. Column 3, line 24, Table I, "<17.8" should read -->17.8--.

Signed and Sealed this

Thirty-first Day of July 1979

[SEAL]

Attest:

Attesting Officer

LUTRELLE F. PARKER

Acting Commissioner of Patents and Trademarks